May 29, 1928.
D. M. CLARK
1,671,405
COMBINATION SANITARY AUTOMATIC CREAMER ATTACHMENT FOR COFFEE URNS
Filed March 9, 1926      2 Sheets-Sheet 1
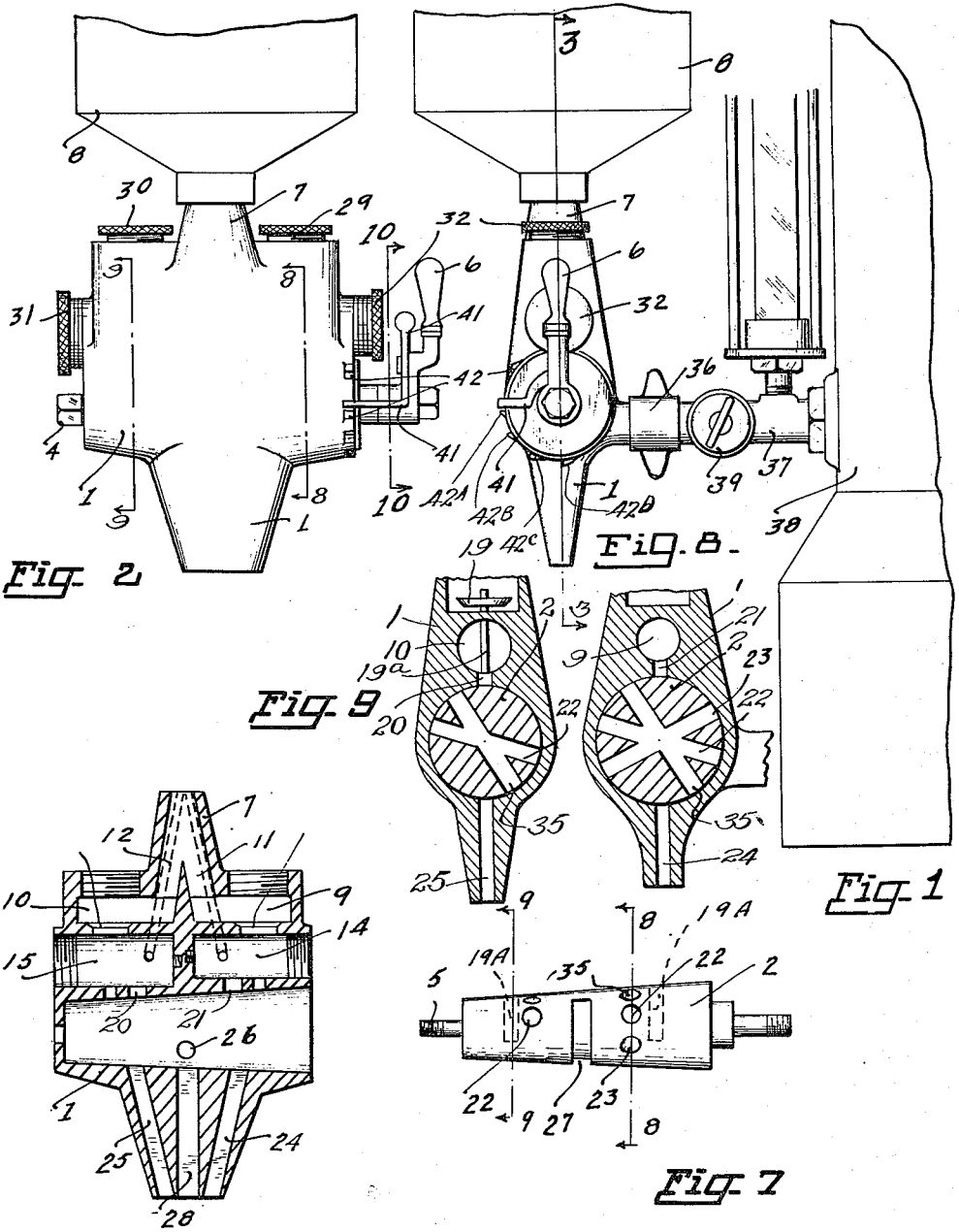
Inventor
Dolph M. Clark
Attorney

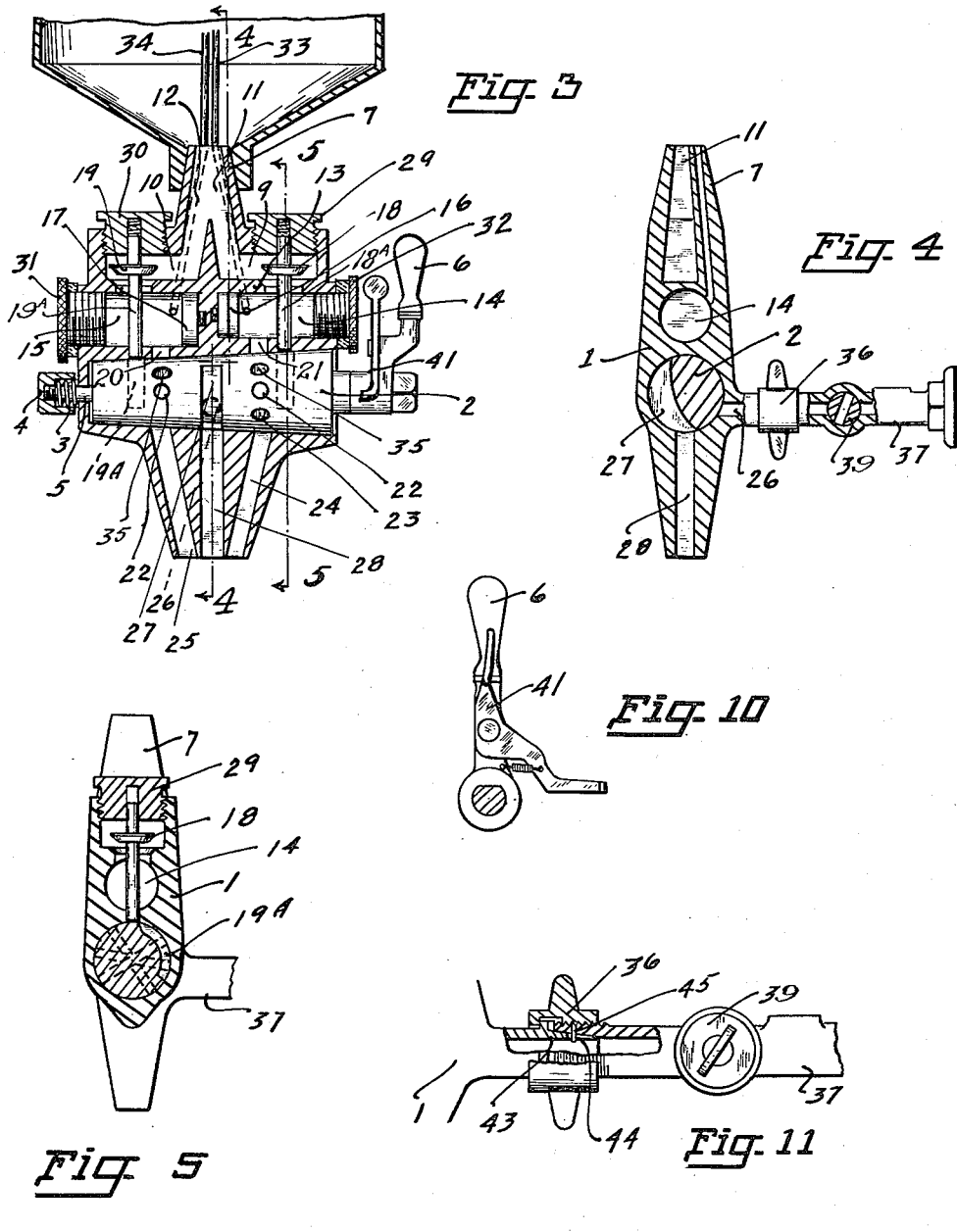

Patented May 29, 1928.

1,671,405

UNITED STATES PATENT OFFICE.

DOLPH M. CLARK, OF PORTLAND, OREGON.

COMBINATION SANITARY AUTOMATIC CREAMER ATTACHMENT FOR COFFEE URNS.

Application filed March 9, 1926. Serial No. 93,454.

My present invention is an improvement over my pending application, filed in the United States Patent Office, under date of May 25, 1925, Serial Number 32,706.

The object of my present invention is to provide a valved mechanism for the dispensing of coffee beverages, either tempered with cream, if desired, in different predetermined amounts, or adapted to dispense cream only therethrough in predetermined amounts without the admission of coffee into the cream.

A further object of my present invention consists in the forming of a device wherein the cream content of coffee may be predetermined by the dispenser in advance of the service and wherein, at all times, a specified amount of cream may be dispensed with each serving of coffee.

A further object of my invention consists in providing means whereby two different cream contents may be served, the amount of the cream content to be predetermined, for either cream and coffee, or one-half cream and one-half coffee, or as the same is known to the trade as half and half. The amount of cream may be regulated by the proprietor in advance for each grade of tempered coffee.

Still further objects of my invention consist in the formation of a device that is easily disassembled for thorough cleaning to maintain the same in a highly sanitary condition.

Additional objects of my invention consist in providing a lever adapted to manual manipulation through the operation of which coffee of the desired cream content may be drawn from the source of supply.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:—

Fig. 1 is a side elevation of one of my devices shown in place attached to a coffee urn and having a cream container disposed thereupon.

Fig. 2 is a front elevation of the mechanism shown in Fig. 1.

Fig. 3 is a cross section view, taken on line 3—3 of Fig. 1, looking in the direction indicated.

Fig. 4 is a cross section view, taken on line 4—4 of Fig. 3, looking in the direction indicated.

Fig. 5 is a cross section view, taken on line 5—5 of Fig. 3, looking in the direction indicated.

Fig. 6 is a cross section view of the main valve frame.

Fig. 7 is a side elevation of the valve core, the same being shown removed from the valve frame.

Fig. 8 is a cross section, taken on line 8—8 of Fig. 7 looking in the direction indicated.

Fig. 9 is a cross section, taken on line 9—9 of Fig. 7, looking in the direction indicated.

Fig. 10 is an end view of the manipulating handle, attached to the valve stem of the valve core.

Fig. 11 is a side view, partially in section, of the piping connection whereby my new and improved device is attached to the coffee urn.

Like reference characters refer to like parts throughout the several views.

1 is the body or frame of the valve, which is preferably made of one piece and having a conical shaped valve core 2, running in a horizontal line thereacross, the same being fitted to the valve frame in a working fit to prevent leakage therearound, the same being held in a tight relation therewith, through the action of the spring 3, and the adjustable tensioning threaded nut 4, attached to the threaded end 5, of the valve core. The valve core is manually actuated through the medium of the handle 6, which is secured to the valve core by being threaded thereupon, or by other suitable fastening means. An inverted cone shaped connection 7, is provided at the upper end of the valve body to which the cream container 8, is attached. The cream container is attached thereto through the medium of this form of connection to facilitate the easy removal of the container as well as its easy attachment thereto, a ground or other suitable connection being provided between the cream container and the valve body. Two chambers 9 and 10 are provided within the valve body and are connected through the conical connection 7, by suitable passageways 11 and 12, to the cream container 8. A horizontal partition and valve seat 13, is disposed below the chambers 9 and 10, and separates the chambers 9 and 10 from the dispensing chambers 14 and 15. The dispensing chambers are provided for the reception of cream thereinto and the dispensing of cream therefrom, in a predetermined amount. The volume of the dispensing chambers may be varied by the placing of fillers 16 and 17 therein. These fillers are maintained in position through the medium of a screw connection between the filler member and the wall structure of the valve frame.

The regulation of the passage of the lacteal fluid from the upper to the lower chambers is governed through the action of the valves 18 and 19 which are secured to valve stems 18$^A$ and 19$^A$ respectively and which operate within suitable guideways to maintain the same in true position. The valves are seated upon the cross horizontal partition 13. Each of the valve stems contact with, and are actuated through the medium of a cam actuator 19$^a$ disposed within the valve core, so that as the valve core is rotated to permit of the dispensing of the lacteal fluid from the dispensing chambers, the valves are permitted to seat and prevent the entrance of the cream from the upper to the lower chambers. As the valve core is further rotated the contents of one or both of the dispensing chambers will be emptied through the passage of the cream from the dispensing chamber or chambers, through the passageways 20 and 21, and thence through the openings or passageways 22 and 23, into the outlet ports 24 and 25, from where the same discharges into a cup or other receptacle. A central passageway 26, leads through the pipe 37 and as the core 2, is actuated, coffee is permitted to flow through the central passageway 26, into the port 27, and be discharged through the discharge port 28, into the receptacle for receiving the same. It may thus be seen that while the amount of cream content that is to be dispensed is predetermined by discharging at each time measured amounts of cream, the quantity of coffee to be dispensed is determined by the attendant and the amount of time that coffee is permitted to flow. To facilitate entrance into the upper chambers I have provided screw plugs 29 and 30 which are secured to the valve body or frame by a threaded connection and to permit of entrance into the lower dispensing chambers I have provided threaded connections with the valve body or frame through the medium of the screw plugs 31 and 32. Vents 33 and 34, are provided, extending into the dispensing chambers to permit a free flow of the cream content therefrom when the ported outlets are opened.

Having described the construction of the valve proper I will now describe its mode of operation, special reference being had to Figs. 1, 8 and 9 in the drawings:

On the exterior of the casing 1 are formed 5 stops, numbered respectively 42, 42$^A$, 42$^B$, 42$^C$ and 42$^D$, which are to be engaged by the pawl 41. When the valve 2 is in a neutral or closed position the pawl 41 engages stop 42$^A$ as shown in Fig. 1. The position of the passageways 22, 23 and 35 relative to the passageways 20 and 21, 24 and 25 is shown in Figs. 8 and 9.

If the valve 2 be rotated clockwise until the pawl 41 engages stop 42, the passageways 35 will be in alignment with passageways 21 and 24, and 20 and 25, the valves 18 and 19 unseated, and the coffee passageway 27 will have been revolved to the opposite side of the casing 1 from the inlet passageway 26. This will admit of a continuous and uninterrupted flow of liquid from the container 8 through the valve. In other words, when the valve is opened to this position cream in the container 8 will flow freely through the valve until either the container is emptied or the valve is closed.

Coffee unadulterated with cream may be had by rotating the valve to the left or contraclockwise until the pawl 41 engages stop 42$^B$, in which position the liquid or coffee flowing through the passageway 26 will flow through the valve. While the valve is in this position none of the passageways 22, 23 and 35 will be in register with the passageways 20 and 21 and the discharge passageways 24 and 25. Coffee will flow freely through the valve while it is maintained in this position.

If coffee with a slight amount of cream is desired, the valve 2 is rotated until the pawl 41 engages stop 42$^C$, the passageway 27 will register with passageways 26 and 28, and passageway 23 will register with passageways 21 and 24. The amount of cream discharged will be the amount that is in the dispensing chamber 14. While the valve is in this position there will be no discharge of liquid from the dispensing chamber 15.

The measured amount of cream may be increased by turning the valve 2 until the pawl 41 engages the stop 42$^D$, at which point the passageways 22 will form a means of communication between passageways 21 and 24, and between passageways 20 and 25. The amount of cream discharged will be the amount that is contained within the dispensing chambers 14 and 15 and no more.

The cream flow, at all times, when the valve is rotated contraclockwise, from the neutral position, is limited to the amount contained in the dispensing chambers 14 and 15, whereas the amount of coffee discharged is limited only to the length of time the valve is left open.

The device may be removed from the coffee urn by the unthreading of the collar 36, from the pipe 37, leading to the coffee urn 38. To lessen the screw tension required for the attachment of the device to the coffee urn, I have provided a tapered connection 43 between the same, and a split is made upon one side of the connection, as shown at 44, into which the pin 45, disposed upon the other side is adapted to engage into, thus maintaining the device in alignment at all times in advance of and after the screw connection is completed. A valve 39 is disposed within the passageway 37 to stop the flow of coffee from the urn when it is found desirable to remove the device from the coffee urn when coffee is being maintained therein. The operating handle is shown at 6, and the pawl 41 is adapted to engagement with suitable stops 42 to indicate the dispensing of the cream content desired.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:—

1. The combination in a sanitary automatic creamer attachment for coffee urns, comprising a valve frame, a valve core disposed within the valve frame, a tension spring and an operating handle for rotating the valve core, secured to the valve core, threaded means for securing the valve frame to the coffee urn and a tapered connection between the valve frame and a cream container dispensing chambers disposed within the valve body and connected by ports to the cream container and selective means for dispensing the contents of the cream from either, or all of the dispensing chambers as coffee is dispensed.

2. In combination in a sanitary automatic creamer attachment for coffee urns, of a valve frame, a conical shaped valve core disposed within the valve frame, a tensioning spring secured to one end of the valve core and adapted to maintain a tight connection between the valve frame and the valve core, dispensing chambers disposed within the valve body and connected to a cream container disposed upon the valve frame by ported connections, valves disposed at the outlet ports leading from the dispensing chambers and selective means adapted to manual manipulation for the drawing of the cream from either one or both of the dispensing chambers simultaneously.

3. In combination in a sanitary automatic creamer attachment for coffee urns, of a valve frame, a conical valve core disposed within the valve frame, a tensioning spring secured to one end of the valve core adapted to maintain a working fit between the valve frame and the valve core, an operating handle disposed upon the valve core and adapted to manual manipulation for the rotation of the valve core, outlet ports disposed within the valve core and adapted to register with ports, connected to a supply of coffee and to dispensing chambers connected with a cream supply, said operating handle carrying a pawl adapted to register with a detent, and to indicate by stops the registering of ports to draw a predetermined amount of cream with each coffee serving.

4. In combination in a sanitary automatic creamer attachment for coffee urns, of a frame, a core disposed within the frame and adapted to manual manipulation, ports within the core and frame and adapted to register with each other upon the manipulation of the core, said ports within the frame leading to a supply of coffee and a supply of cream, and cream dispensing chambers disposed within the path of the cream ports and selective means for drawing cream from either one or all of the cream dispensing chambers simultaneously as coffee is discharged through the coffee ports.

5. In combination in a sanitary automatic creamer attachment for coffee urns, of a frame, a core disposed within the frame, said frame connected to a coffee urn and a cream container, ports conducting cream and coffee from the source of supply through ports to a valve core, dispensing chambers disposed within cream ports, fillers disposed within the dispensing chambers to vary the volume of the chambers, and ports disposed within the valve core adapted to register with the ports for conducting the cream and the coffee from the source of supply to the core, and selective means adapted to dispense coffee and coffee tempered with a predetermined cream content.

6. In combination in a sanitary automatic creamer attachment for coffee urns, a valve frame, a core seated within the frame provided with inlet ports connected to a cream and coffee supply, and discharge ports and having ports adapted to register with ports connected to a supply of coffee and cream and with the discharge ports, dispensing chambers disposed within the ports leading to the cream supply, valves disposed at the inlet to the dispensing chambers, manually manipulative means for operating said valve core, and means upon the core cooperating with said manipulative means for causing desired ports in said core to register with inlet and discharge ports in said frame.

7. A sanitary automatic creamer attachment for coffee urns, comprising a valve body, a conical valve core removably positioned within said body, there being a series of openings through said core; upper chambers in said valve body connected to a cream container, dispensing chambers positioned below said upper chambers, valves positioned between the upper chambers and the dispensing chambers, fillers removably maintained in said dispensing chambers, passageways connecting said dispensing chambers with selected openings through the valve core, and means on said valve to register the selected opening therethrough with said passageways.

8. A sanitary automatic creamer attachment for coffee urns, comprising a valve body, a conical valve core removably maintained within said body, there being a series of openings through said core, one of said openings being central thereof, inlet and outlet ports registerable with said central opening, upper chambers in said valve body connected with a cream container, dispensing chambers positioned below said upper chambers, valve seats positioned between the upper chambers and the dispensing chambers, stemmed valves slidably engaging said seats, cams formed on said core and engaging said stemmed valves, fillers removably maintained in said dispensing chambers, passageways connecting said dispensing chambers with selected openings through the valve core, means on said valve core to register the selected openings therethrough with said passageways, and outlet ports in said valve body connecting with the openings through the core.

9. A sanitary automatic attachment for coffee urns, comprising a valve body, a removable valve core revolubly maintained within said body, there being a series of openings through said core; upper chambers in said valve body connected with a cream container, dispensing chambers positioned below said upper chambers, valve seats positioned between the upper chambers and the dispensing chambers, stemmed valves slidably engaging said seats, cams formed on said core and engaging said stemmed valves, fillers removably maintained in said dispensing chambers, passageways connecting said dispensing chambers with selected openings through the valve core, means on said valve core to register the selected openings therethrough with said passageways, and outlet ports in said valve body connecting with the openings through the core.

10. A sanitary automatic creamer attachment for coffee urns, comprising a valve body, a removable valve core revolubly maintained in said valve body, there being a series of openings through said core, one of said openings being central thereof, inlet and outlet ports in said valve body registerable with said central opening; upper chambers in said valve body connected to a cream container, dispensing chambers positioned between the upper chambers and the dispensing chambers, fillers removably maintained in said dispensing chambers, passageways connecting said dispensing chambers with selected openings through the valve core, means on said valve core to register the selected openings therethrough with said passageways, and outlet ports in said valve body connecting with the openings through the core.

DOLPH M. CLARK.